United States Patent [19]

Werner

[11] Patent Number: 4,476,418
[45] Date of Patent: Oct. 9, 1984

[54] WELL PUMP CONTROL SYSTEM

[76] Inventor: John W. Werner, 4710 59th St., Lubbock, Tex. 79414

[21] Appl. No.: 398,085

[22] Filed: Jul. 14, 1982

[51] Int. Cl.³ .............................................. H02P 1/04
[52] U.S. Cl. .................................... 318/332; 318/466; 318/127; 417/415
[58] Field of Search ................................ 318/463–466, 318/432, 127, 443, 470; 261/24, 26, 34 R; 254/264, 266; 417/12, 15, 18, 22, 23, 42, 44, 415, 419; 443/161; 74/89.22, 108; 227/130, 131

[56] References Cited

U.S. PATENT DOCUMENTS

| 2,316,494 | 4/1943 | Tipton | 103/25 |
|---|---|---|---|
| 2,456,456 | 12/1948 | Smith | 103/25 |
| 2,661,697 | 12/1953 | Long et al. | 103/25 |
| 2,716,381 | 8/1955 | Parker | 318/177 |
| 2,956,511 | 10/1960 | Morehead | 417/415 |
| 3,075,466 | 6/1963 | Agnew et al. | 417/415 |
| 3,105,443 | 10/1963 | Johnson | 103/12 |
| 3,285,081 | 4/1965 | Kuhns et al. | 417/44 |
| 3,320,820 | 5/1965 | Banks | 74/108 |
| 3,363,573 | 1/1968 | Jaeger | 103/25 |
| 3,440,512 | 4/1969 | Hubby | 318/474 |
| 3,509,824 | 5/1970 | Schmidly, Jr. | 417/12 |
| 3,640,342 | 2/1972 | Gault | 166/72 |
| 3,778,694 | 12/1973 | Hubby et al. | 417/44 |
| 3,854,846 | 12/1974 | Douglas | 417/12 |
| 3,930,752 | 1/1976 | Douglas | 417/12 |
| 3,953,777 | 4/1976 | McKee | 318/474 |
| 3,963,374 | 6/1976 | Sullivan | 417/40 |
| 4,062,640 | 12/1977 | Gault | 417/415 |
| 4,118,148 | 10/1978 | Allen | 417/12 |
| 4,145,161 | 3/1979 | Skinner | 417/53 |

Primary Examiner—George H. Miller, Jr.
Assistant Examiner—Arthur G. Evans
Attorney, Agent, or Firm—Hubbard, Thurman, Turner & Tucker

[57] ABSTRACT

A well pump control system is disclosed for utilization with a conventional well pump having a stationary member and a reciprocating member. The reciprocating member operates a down-hole pump and is attached to a rocking beam. The rocking beam is driven by an electric motor through a counterbalanced crank. The position of the counterbalanced crank and the speed of the electric motor are utilized to operate a reduced voltage starter which acts to control the voltage applied to the electric motor. In this manner, voltage may be selectively and gradually applied to and removed from the electric motor at selected points during the pump cycle to both minimize power consumption and increase slip during heavy loading, by allowing the momentum of the crank to operate the reciprocating member during at least a portion of each cycle of the pump.

12 Claims, 2 Drawing Figures

WELL PUMP CONTROL SYSTEM

BACKGROUND OF THE INVENTION

This invention relates in general to control systems for utilization with well pumps and in particular to control systems which periodically remove power from the driving motor during a portion of each cycle of the well pump.

In the prior art it is known to utilize well pump control systems which remove power from the motive force for long periods of time to avoid operating the well pump when no oil is present in the underground pool. Such systems generally operate based upon the flow rate of oil from the well and are necessary to avoid a condition known as "fluid pound" which occurs when the pump plunger compresses expanded gases in the top of the chamber above the pump and the pump contacts the surface of the liquid in a sudden manner. This condition causes vibration and oscillation which may be destructive to the pump and production tubing.

As important as the avoidance of "fluid pound" is the avoidance of sudden vibration and oscillation which occurs as the reciprocating member in the well pump is suddenly lifted from the bottom of each stroke when fluid is present. The substantially incompressible nature of the fluids involved and the inertia which must be overcome at the beginning of each stroke of the pump create a sudden and substantial strain on the well pumping equipment. To compensate for the wear on well pump equipment and to increase the operability of electric motors utilized with such pumps, it is common to design electric motors which are to be utilized in well pumps with a high amount of "slip" capability. This slip is the amount of slip from synchronous motor speed that occurs as the motor attempts to overcome the weight of the fluid column on top of the pump at the beginning of each stroke. This slip generates high currents and great heat and it is quite expensive to design an electric motor to permit such slip. Additionally, the high current peaks generated during such slip operation and the fact that the motor is substantially unloaded during each downstroke cause a poor power factor and an attendant increase in operating costs.

SUMMARY OF THE INVENTION

It is therefore one object of the present invention to provide an improved well pump control system.

It is another object of the present invention to provide an improved well pump electric motor control system which improves power factor and permits large amounts of "slip."

It is yet another object of the present invention to provide an improved well pump electric motor control system which reduces peak current demand.

It is another object of the present invention to provide an improved well pump electric motor control system which may be easily and inexpensively installed on existing well pump equipment.

The foregoing objects are achieved as is now described. A conventional well pump is provided having a stationary member and a reciprocating member. The reciprocating member operates a down-hole pump and is attached to a rocking beam. The rocking beam is driven by an electric motor through a counterbalanced crank. The position of the counterbalanced crank and the speed of the electric motor are utilized to operate a reduced voltage starter which acts to control the voltage applied to the electric motor. In this manner, voltage may be selectively and gradually applied to and removed from the electric motor at selected points during the pump cycle to both minimize power consumption and increase slip during heavy loading, by allowing the momentum of the crank to operate the reciprocating member during at least a portion of each cycle of the pump.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
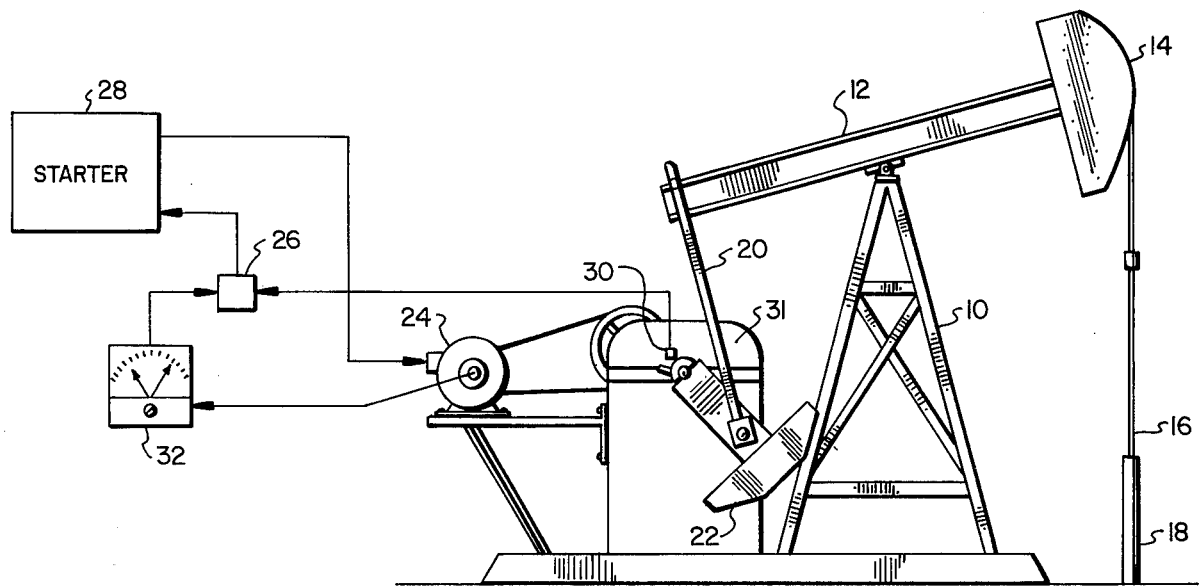
FIG. 1 is a partially schematic, partially diagrammatic view of the novel well pump control system of the present invention.

With reference now to the figures, and in particular with reference to FIG. 1 there is depicted a partially schematic, partially diagrammatic view of the novel well pump control system of the present invention. Many of the components depicted in FIG. 1 are standard well pump operating components and those skilled in the art will appreciate, upon reference to FIG. 1, that the novel well pump control system of the present invention may be easily and inexpensively added to existing well pump equipment.

A conventional well pump is depicted in FIG. 1, including a support member 10 which supports a pivotally mounted rocking beam 12. Rocking beam 12 includes horsehead 14 which is attached to a reciprocating rod 16. Rod 16 is utilized to operate a down-hole pump (not shown) through reciprocating motion with respect to tubing 18, in a manner well known in the art. The opposite end of rocking beam 12 is coupled, via connecting rod 20, to counterbalanced crank 22. Again, as is well known in the art, counterbalanced crank 22 is driven through a series of gears and/or belts by electric motor 24. Such systems are generally balanced in what is called the "rod heavy" mode, and if allowed to coast, will come to rest in a position with rod 16 at its lowest point and counterbalanced crank 22 at its uppermost or "twelve o'clock" position.

As counterbalanced crank 22 is driven clockwise past the "twelve o'clock" position by a combination of its own momentum and electric motor 24, rod 16 is lifted up out of the wall, lifting fluid from the well bore. It is this sudden lifting and accompanying increase in motor torque which cause electric motor 24 to "slip" from synchronous speed. Those skilled in the art will appreciate that if motor 24 is not permitted to slip, the sudden load present when rod 16 is lifted will cause undue loading and strain on the mechanical components of the well pump.

A novel feature of the well pump control system of the present invention is the manner in which electric motor 24 is allowed to slip from synchronous motor speed without the necessity of designing electric motor 24 to withstand the high current peaks and wear associated with such slippage. As discussed above, if rocking beam 12 is allowed to settle, rod 16 will drop to its lowest position with respect to tubing 18. This dropping of rod 16 will begin shortly after counterbalanced crank 22 has passed the "six o'clock" position in its clockwise rotation. To detect the beginning of this portion of each cycle of the well pump, switch 30 is placed on support means 31, in proximity to counterbalanced crank 22, and is utilized to detect the beginning of that portion of the well pump cycle which occurs shortly after counterbalanced crank 22 has passed the "six o'clock" position, (eg. rod 16 is dropping due to the effect of gravity). Switch 30 may be a magnetic, mechanical or optical switch and is utilized to couple a control pulse to control relay 26. Control relay 26 in turn controls reduced voltage starter 28. Reduced voltage starter 28, in a preferred embodiment of the present invention, comprises any standard, solid-state motor starter which produces controlled reduced voltage starts. Model number CR 170 manufactured by the General Electric Company is an excellent example of this type of starter, and in a prototype unit of this novel well pump control system, a General Electric Model No. CR 170 was utilized to operate the electric motor. Reduced voltage starter 28, in response to an input from switch 30, removes voltage from electric motor 24 and allows electric motor 24 to coast, as counterbalanced crank 22 is driven toward the "twelve o'clock" position by the effect of gravity on rod 16.

As those skilled in the art will appreciate, as counterbalanced crank 22 approaches and passes the "twelve o'clock" position, the momentum associated with the mass of counterbalanced crank 22 will tend to cause counterbalanced crank 22 to rotate past the "twelve o'clock" position. In opposition to the momentum of counterbalanced crank 22 is the inertia generated by the column of fluid present within tubing 18, which rod 16 is attempting to lift to the surface. It is this sudden increase in the load on rod 16 which causes the electric motor in a conventional well pumping system to slip from its synchronous speed and which the novel well pump control system of the present invention seeks to overcome. As counterbalanced crank 22 passes the "twelve o'clock" position and encounters this increased load, the rotation of counterbalanced crank 22 will begin to slow down and will eventually stop. If unaided by the action of electric motor 24, counterbalanced crank 22 will begin to rotate in a counterclockwise position and oscillate briefly about the "twelve o'clock" position before coming to rest at that position.

To prevent the cessation of operation just described, a set-point tachometer 32 is attached to electric motor 24 and is utilized to monitor the speed of electric motor 24. Thus, as electric motor 24 begins to slow down (counterbalanced crank 22 passes the "twelve o'clock" position) the amount of voltage generated by an electrical tachometer coupled to set-point tachometer 32 will decrease. Those skilled in the art will appreciate that it is a simple matter to determine a reference voltage corresponding to a selected reduced speed of electric motor 24 and provide a signal when the speed of electric motor 24 falls below the speed associated with said reference voltage. At that point, set-point tachometer 32 will provide a signal to control relay 26 which in turn will operate reduced voltage starter 28 to begin to provide power to electric motor 24. A reduced voltage starter is utilized in a preferred embodiment of the present invention to apply a gradually increasing voltage to electric motor 24 and accomplish a smooth transition from the free running mode to the powered mode. In this manner, those ordinarily skilled in the art will appreciate that without unduly modifying the design of electric motor 24, electric motor 24 can be operated with up to one hundred percent (100%) slip, that is, electric motor 24 may be allowed to come to a complete stop as counterbalanced crank passes the "twelve o'clock" position and then power may be applied to electric motor 24 in a controlled manner to continue the rotation of counterbalanced crank 22 in a clockwise manner. In this manner, power is removed from electric motor 24 during that portion of each cycle of the well pump in which the weight of rod 16 will cause the pump to continue without motive force. Additionally, the resumption of the application of power to electric motor 24 in a gradual and selected manner will permit electric motor 24 to slip substantially below synchronous motor speed without the possibility of damage to electric motor 24 and without the generation of large current peaks associated with known electric motors.

Figure 2:
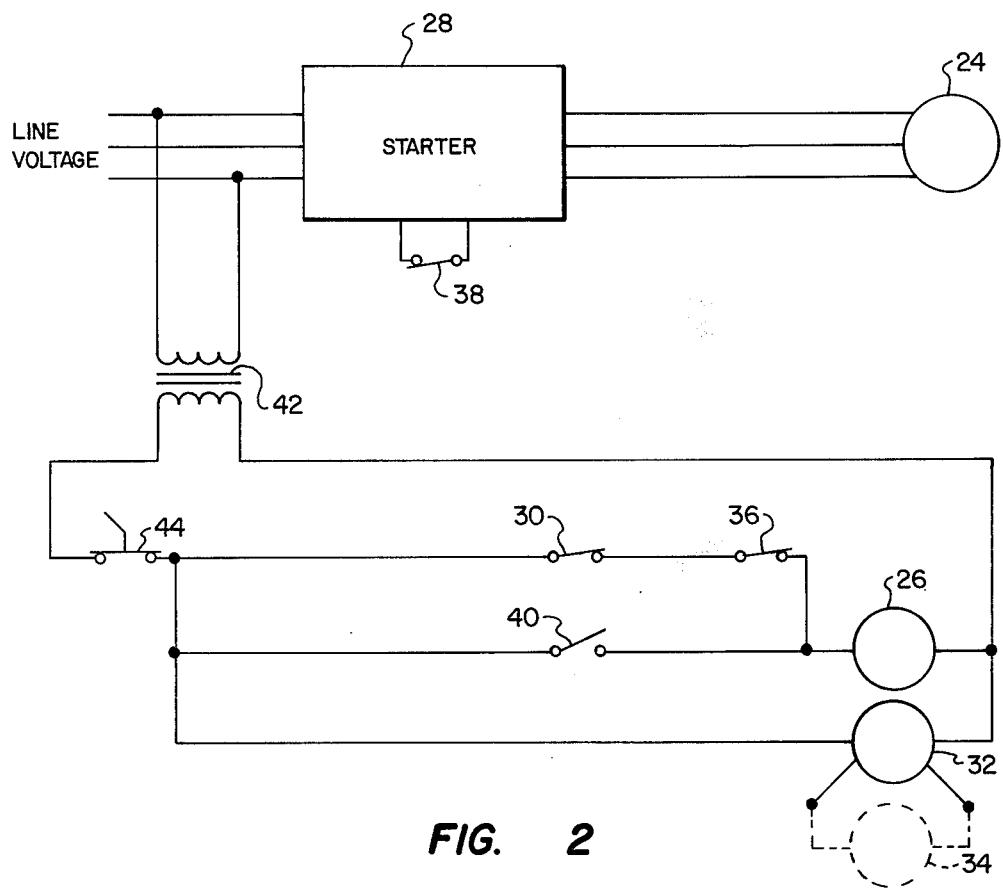
FIG. 2 is a schematic view of the novel well pump motor control system of the present invention.

With reference now to FIG. 2, there is depicted a schematic diagram of the well pump control system of the present invention. Where possible, the reference numerals utilized in FIG. 2 are identical to the reference numerals utilized for similar components in FIG. 1. As may be seen in FIG. 2, electric motor 24 is connected to a line voltage supply through reduced voltage starter 28. Transformer 42 is provided from the line voltage supply to provide operating voltage to the control circuitry of the present invention. Switch 44 is utilized to energize the control system of the present invention and applies voltage to set-point tachometer 32 and control relay 26.

Switch 30, which may be a mechanical, magnetic or optical switch as discussed above, is normally closed and will momentarily open when counterbalanced crank 22 (see FIG. 1) passes a selected position slightly past the "six o'clock" position. Relay contacts 36 and 38 are controlled by control relay 26 and will close when control relay 26 is energized. Set-point tachometer 32 includes a generator 34 for generating an electrical voltage proportional to the speed of electric motor 24. Set-point tachometer 32 includes means for setting a reference voltage and relay contact 40 will close whenever the output of generator 34 falls below the reference voltage set by set-point tachometer 32.

The control system depicted in FIG. 2 is depicted in the position which corresponds to power being applied to electric motor 24. Switch 30, the normally closed position indication switch associated with counterbalanced crank 22, is closed. Relay 26 is energized and contacts 36 and 38 are closed, activating reduced voltage starter 28 and applying voltage to electric motor 24. As counterbalanced crank 22 (see FIG. 1) passes the selected position slightly past the "six o'clock" position of its cycle, switch 30 will open, removing power from control relay 26. As power is removed from control relay 26, contacts 36 and 38 will open and reduced voltage starter 28 will remove power from electric motor 24. Electric motor 24 will begin to slow down as it encounters the load associated with lifting rod 16, and generator 34 will begin to generate lower and lower voltages. As the voltage generated by generator 34 decreases below the voltage set at set-point tachometer 32, contact 40 will close, once again applying power to control relay 26. As control relay 26 is energized, contacts 36 and 38 will close and starter 28 will again begin to apply voltage to electric motor 24.

As those ordinarily skilled in the art will appreciate, the well pump control system of the present invention will have the effect of saving energy by removing power from electric motor 24 during at least a portion of each cycle of the well pump and the control system of the present invention will permit electric motor 24 to slip from synchronous motor speed without the possibility of damaging currents in the windings thereof.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A motor control system for the control of an electric motor operatively connected to a well pump having a stationary member and a reciprocating member cyclically operable along a substantially vertical line, said motor control system comprising:
   first means for removing power from said electric motor shortly after said reciprocating member has passed the high point along said substantially vertical line; and
   second means for applying power to said electric motor at a selected point after said reciprocating member has passed the low point along said substantially vertical line whereby power is removed from said electric motor during substantially half of each cycle of said reciprocating member.

2. The motor control system according to claim 1 wherein said reciprocating member is attached to a rocking beam and said rocking beam is driven by an electric motor through a counterbalanced crank and wherein said first means comprises a mechanical lever attached to said counterbalanced crank for operating an electrical switch at a fixed point during each cycle of said counterbalanced crank.

3. The motor control system according to claim 1 wherein said reciprocating member is attached to a rocking beam and said rocking beam is driven by an electric motor through a counterbalanced crank and wherein said first means comprises a magnetic device attached to said counterbalanced crank for operating a magnetic switch at a fixed point during each cycle of said counterbalanced crank.

4. The motor control system according to claim 2 or 3 wherein said second means comprises a tachometer attached to said electric motor for generating a signal proportional to the speed of said electric motor and means for applying power to said electric motor after said electric motor has slowed to a preselected speed.

5. A control system for the control of a well pump having a stationary member and a reciprocating member, said control system comprising:
   an electric motor operatively connected to said reciprocating member for cyclically operating said reciprocating member between a high point and a low point along a substantially vertical line;
   first means for removing power from said electric motor shortly after said reciprocating member has passed said high point along said substantially vertical line; and
   second means for applying power to said electric motor at a selected point after said reciprocating member has passed said low point along said substantially vertical line whereby power is removed from said electric motor during substantially half of each cycle of said reciprocating member.

6. The motor control system according to claim 5 wherein said reciprocating member is attached to a rocking beam and said rocking beam is driven by an electric motor through a counterbalanced crank and wherein said first means comprises a mechanical lever attached to said counterbalanced crank for operating an electrical switch at a fixed point during each cycle of said counterbalanced crank.

7. The motor control system according to claim 5 wherein said reciprocating member is attached to a rocking beam and said rocking beam is driven by an electric motor through a counterbalanced crank and wherein said first means comprises a magnetic device attached to said counterbalanced crank for operating a magnetic switch at a fixed point during each cycle of said counterbalanced crank.

8. The motor control system according to claim 6 or 7 wherein said second means comprises a tachometer attached to said electric motor for generating a signal proportional to the speed of said electric motor and means for applying power to said electric motor after said electric motor has slowed to a preselected speed.

9. A well pump comprising:
   a stationary member;
   a reciprocal member cyclically operable between a first position and a second position;
   a pivotally mounted rocking beam with a first end attaching to said reciprocating member;
   a counterbalanced crank attached to a second end of said rocking beam;
   an electric motor operably connected to said counterbalanced crank;
   a first means for removing power from said electric motor at a first selected intermediate point while said reciprocating member is moving from said first position to said second position; and
   second means for applying power to said electric motor at a second selected intermediate point while said reciprocating member is moving from said second position to said first position whereby power is removed from said electric motor for greater than half of each cycle of said reciprocating member.

10. A method of controlling an electric motor operatively connected to a well pump having a stationary member and a reciprocating member cyclically operable between a high point and a low point along a substantially vertical line, said method comprising the steps of:
    removing power from said electric motor shortly after said reciprocating member has passed said high point along said substantially vertical line; and
    applying power to said electric motor at a selected point after said reciprocating member has passed said low point along said substantially vertical line.

11. A motor control system for the control of an electric motor operatively connected to a well pump having a stationary member and a reciprocating member cyclically operable between a first position and a second position, said motor control system comprising:

first means for removing power from said electric motor at a first selected intermediate point while said reciprocating member is moving from said first position to said second position; and second means for applying power to said electric motor at a second selected intermediate position while said reciprocating member is moving from said second position to said first position whereby electrical power is removed from said electric motor for greater than half of each cycle of said reciprocating member.

12. A control system for the control of a well pump having a stationary member and a reciprocating member, said control system comprising:

an electric motor operatively connected to said reciprocating member for cyclically operating said reciprocating member between a first position and a second position;

first means for removing power from said electric motor at a first selected intermediate point while said reciprocating member is moving from said first position to said second position; and second means for applying power to said electric motor at a second selected intermediate point while said reciprocating member is moving from said second position to said first position whereby electrical power is removed from said electric motor for greater than half of each cycle of said reciprocating member.

* * * * *